US008234290B2

(12) United States Patent
Hofhansi et al.

(10) Patent No.: US 8,234,290 B2
(45) Date of Patent: Jul. 31, 2012

(54) METHOD FOR MONITORING AND CONTROLLING THE PROCESSING OF DATABASE SEARCHES

(75) Inventors: Lars Hofhansi, San Francisco, CA (US); Steven Tamm, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 373 days.

(21) Appl. No.: 12/262,744

(22) Filed: Oct. 31, 2008

(65) Prior Publication Data

US 2010/0114912 A1    May 6, 2010

(51) Int. Cl.
*G06F 17/30* (2006.01)
(52) U.S. Cl. .......................................... 707/758; 707/749
(58) Field of Classification Search .................. None
See application file for complete search history.

(56) References Cited

U.S. PATENT DOCUMENTS

| | | | | |
|---|---|---|---|---|
| 7,308,446 | B1 * | 12/2007 | Panigrahy et al. | 707/999.006 |
| 7,487,150 | B2 * | 2/2009 | Brown et al. | 707/999.004 |
| 7,644,080 | B2 * | 1/2010 | Mammen et al. | 707/713 |
| 2004/0088403 | A1 * | 5/2004 | Aggarwal | 709/224 |

OTHER PUBLICATIONS

Lee et al. "Learning Fingerpints for a Database Intrusion Detection System", ESORICS 2002, p. 264-279.*
Kumar et al. "An application of Pattern Matching in INtrusion Detection", Purdue e-Pubs Computer Science Technical Reports, Feb. 1, 1994.*

* cited by examiner

*Primary Examiner* — Yuk Ting Choi
(74) *Attorney, Agent, or Firm* — Haynes Beffel & Wolfeld; Ernest J. Beffel, Jr.

(57) ABSTRACT

Systems, methods, and apparatus for preventing misuse of searches of a database system are provided. This prevention of misuse of database searches can enable reliable operation of the database system, as an improper query using a regular expression will not shut down or severely affect an application process that provides access to the database system. A thread of the application process determines whether an input character string matches the regular expression. To prevent misuse, a computational effort of the search is tracked, and compared to a threshold value. When the threshold is exceeded, an operation of the thread is exited or stopped.

20 Claims, 7 Drawing Sheets

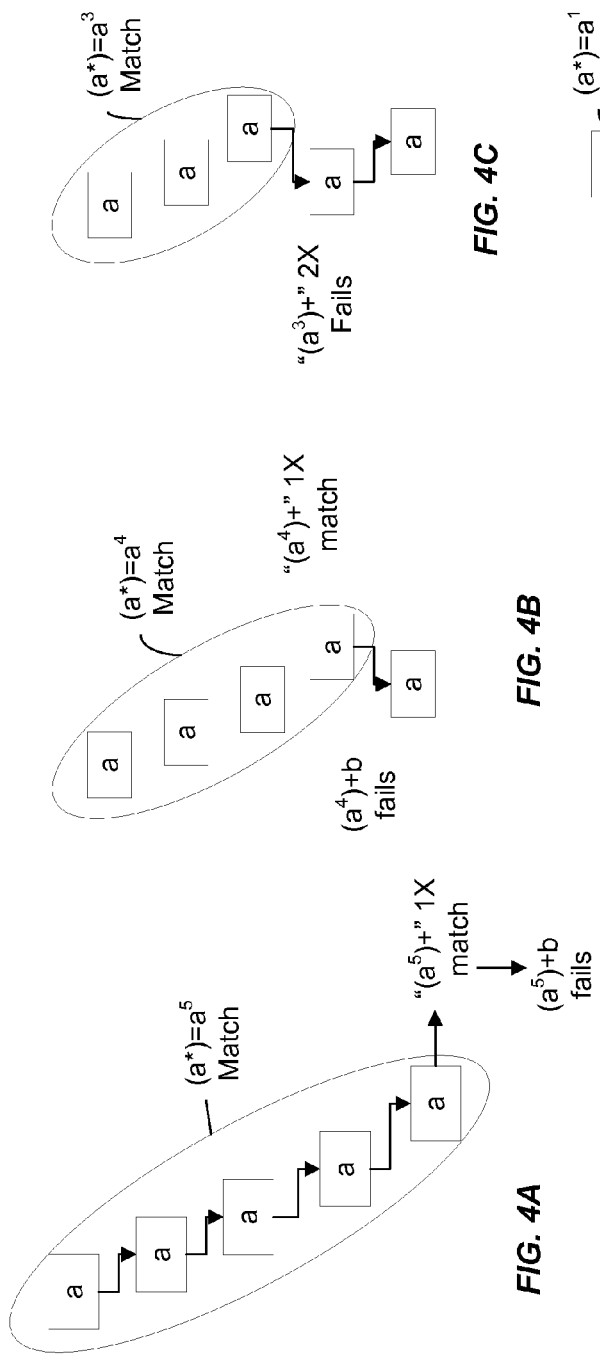
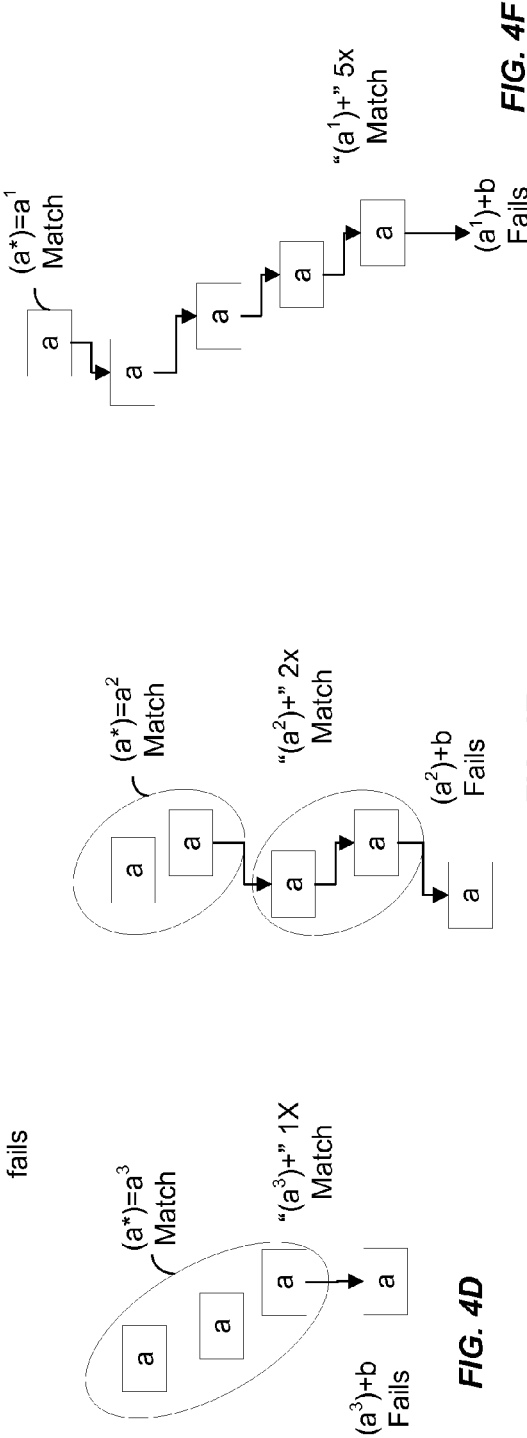

METHOD FOR MONITORING AND CONTROLLING THE PROCESSING OF DATABASE SEARCHES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to searching a database, and more particularly to preventing the misuse of searches in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query (i.e. a search request) from the user system to the database system. The database system might process the request for information received in the query and send to the user system information relevant to the request. The reliable and efficient retrieval of accurate information and subsequent delivery of this information to the user system has been and continues to be a goal of administrators of database systems.

Unfortunately, conventional database approaches are at the mercy of a user's query. For example, conventional databases might process a query relatively slowly or become inefficient, if, for example, a user has entered an inappropriate or malicious query.

Accordingly, it is desirable to provide systems and methods that prevent misuse of database searches, particularly without adding unwanted complexity and cost of operation to a database system.

BRIEF SUMMARY

In accordance with embodiments, there are provided systems, methods, and apparatus for preventing misuse of searches of a database system. This prevention of misuse of database searches can enable reliable operation of the database system, as an improper query using a regular expression will not shut down or severely affect an application process that provides access to the database system. A thread of the application process determines whether an input character characters string matches the regular expression. To prevent misuse, a computational effort of the search is tracked, and compared to a threshold value. When the threshold is exceeded, an operation of the thread is exited or stopped.

In an embodiment and by way of example, a method for preventing misuse of database searches is provided. A regular expression is received in a first thread of an application process. A database is searched to find an input character string that matches the regular expression. A duration of the searching scales greater than linearly with a size of an input character string. This scaling can occur in order to guarantee a determination of whether an input character string matches the regular expression. The first thread tracks a computational effort performed during the search, and compares the computational effort to a threshold value. An internal exit is performed in the first thread when the computational effort exceeds the threshold value. As used herein, a thread is contained inside a process. Different threads in the same process may share some resources.

Other embodiments are directed to a computer program product having a computer readable media with instructions that perform methods described herein.

In an embodiment and by way of example, a database system is provided. An input interface receives a regular expression from a user. Logic (e.g. a processor) runs a first thread of an application process. The first thread receives the regular expression, and searches a database of the database system to find an input character string that matches the regular expression. A duration of the searching scales greater than linearly with a size of an input character string. This scaling can occur in order to guarantee a determination of whether an input character string matches the regular expression. A computational effort performed during the search is tracked, and then compared to a threshold value. The determination of whether an input character string matches the regular expression is stopped when the computational effort exceeds the threshold value.

While embodiments may be described with reference to an embodiment in which techniques for preventing misuse of database searches are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

FIGS. 4A-4F illustrates a backtracking algorithm according to an embodiment of the present invention.

DETAILED DESCRIPTION

General Overview

Systems and methods are provided for preventing misuse of database searches. These techniques for preventing misuse of database searches can enable embodiments to provide more reliable operation, as an improper query will not shut down or severely affect the operation of the database.

As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the term query plan refers to a set of steps used to access information in a database system.

Next, mechanisms and methods for providing controlling access to custom objects in a database system will be described with reference to example embodiments.

System Overview

Figure 1:
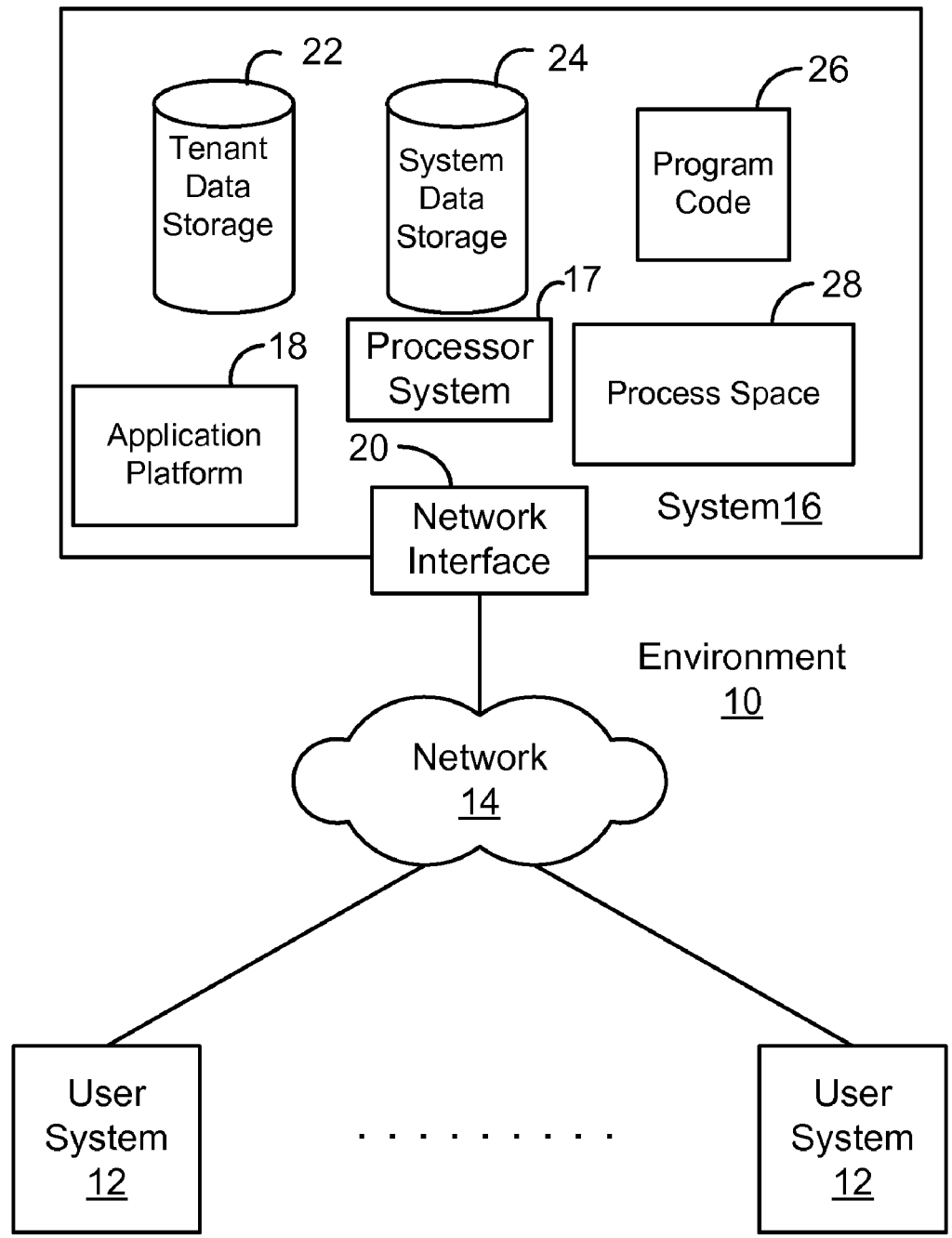
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application (s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
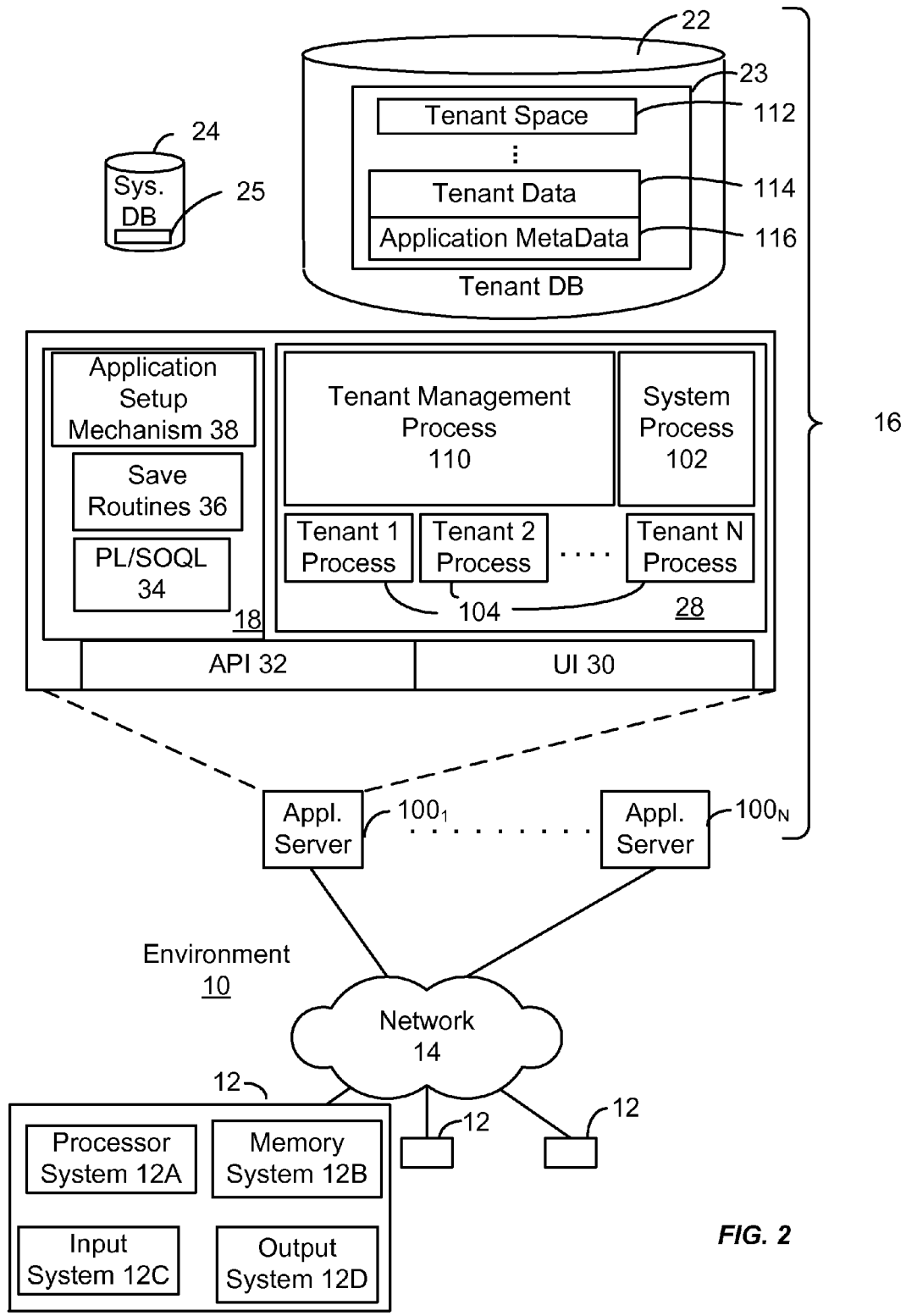
FIG. 2 illustrates a block diagram of an embodiment of elements of FIG. 1 and various possible interconnections between these elements.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multitenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

The query plan may include a search for a particular set of characters, i.e. a character string. For example, the search may be for data of a particular row or column of a database table (object). A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system.

Given that a user may customize a field, the information contained in the database may take on any form. In order to provide custom searches, a database may allow a user to enter a formula (regular expression) to find fields with specific patterns of characters. However, as described below, providing the user with this control and flexibility can cause problems. For example, overall run times for a particular search can effectively shut down the database system.

Regular Expressions

As described above, part of a query to a database typically involves a search to find a particular character string or class of character strings. The matching character string (e.g. a field in the database) may be used to identify information that a user seeks.

For, instance a user might want to look for account information associated with XYZ corp. The database would return a result by peforming a pattern match of the text "XYZ Corp," for example, in order to identify data associated with XYZ Corp. A user might also want to look for all affiliates or forms of XYZ, such as XYZ inc., XYZ ag, etc. A user can easily perform such a search by using a regular expression.

Regular expressions provide a concise and flexible means for identifying strings of text of interest, such as particular characters, words, or patterns of characters. Symbols are used to easily specify the exact type of character string being sought. Common option for regular expressions might be wildcards, or the allowance for repetition of a character(s). The regular expression essentially acts as a formula for finding the string of interest.

Examples of some symbols (operators) for regular expression are as follows. For alternation, a vertical bar separates alternatives. For example, gray|grey can match "gray" or "grey". For grouping, parentheses are used to define the scope and precedence of the operators (among other uses). For example, gray|grey and gr(a|e)y are equivalent patterns which both describe the set of "gray" and "grey".

For quantification, a quantifier after a token (such as a character) or group specifies how often that preceding element is allowed to occur. The most common quantifiers are ?, *, and +. The question mark "?" indicates there is zero or one of the preceding element. For example, colou?r matches both "color" and "colour". The asterisk "*" indicates there are zero or more of the preceding element. For example, ab*c matches "ac", "abc", "abbc", "abbbc", and so on. The plus sign "+" indicates that there is one or more of the preceding element. For example, ab+c matches "abc", "abbe", "abbbc", and so on, but not "ac".

These constructions can be combined to form arbitrarily complex expressions, much like one can construct arithmetical expressions from numbers and the operations +, −, ×, and ÷. An exemplary method using a regular expression is as follows.

Example Query Method

Figure 3:
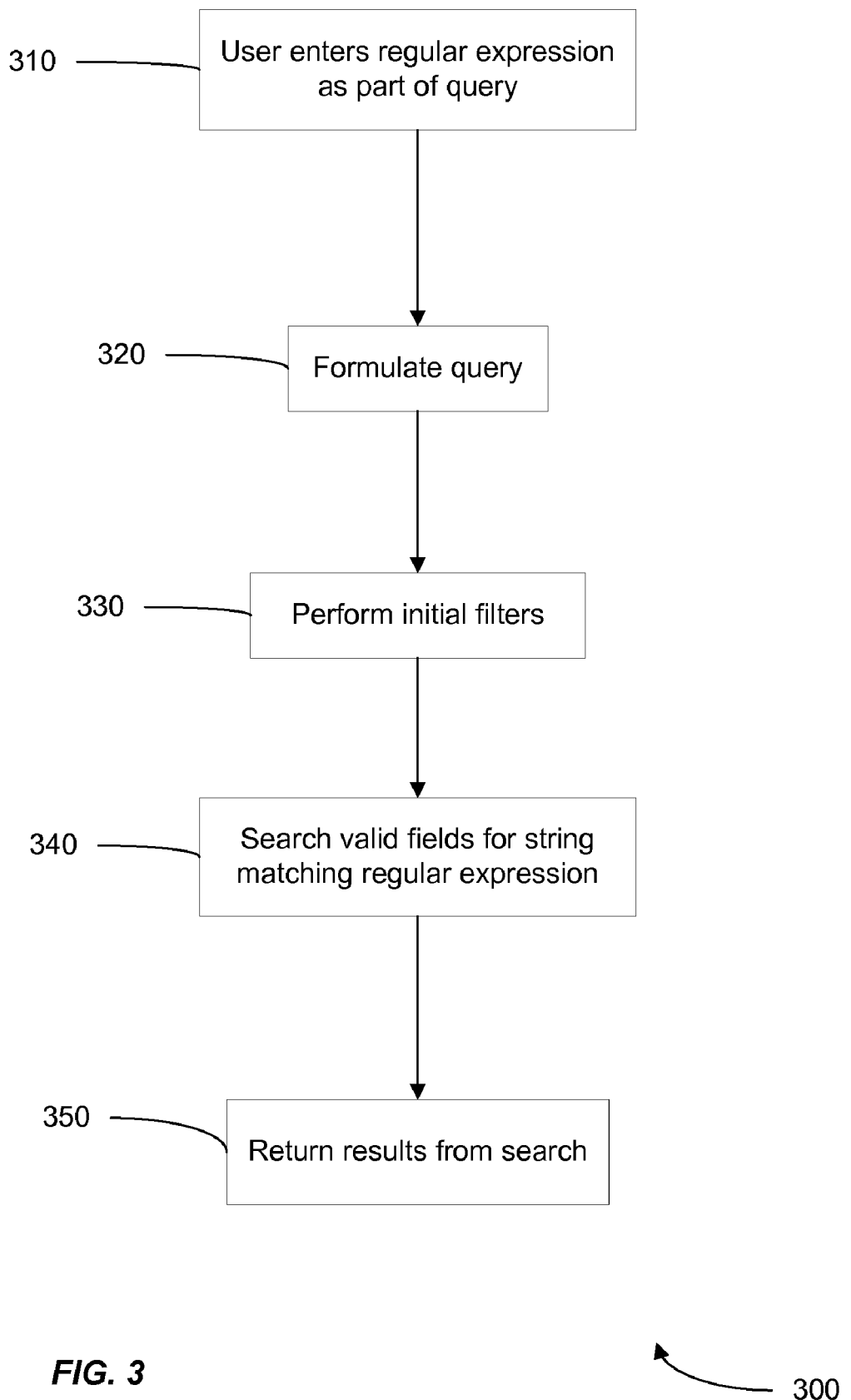
FIG. 3 is a flowchart illustrating a method for performing a database search according to an embodiment of the present invention.

FIG. 3 is a flowchart illustrating a method 300 for performing a database search according to an embodiment of the present invention. As described above, a user may enter a regular expression in order to find particular fields of a database. Additional parameters for the search may request particular data associated (e.g. linked) with that field. For example, when a field is a column and/or row, the additional parameters may select particular data from that column.

In step 310, the user enters a regular expression. In one embodiment, this may be done by entering symbols and characters into a window of an application (e.g. application running on the database). In another embodiment, characters may be combined with actions (e.g. corresponding to particular symbols) chosen from lists (such as drop down lists).

In step 320, a query is formulated based on the regular expression that was entered. For example, an application server of a database system may formulate the query. The query may include other filters (e.g. additional parameters) entered by the user or imposed by the database system. For example, the system may allow access to only data to which the user is authorized.

In step 330, some of the filters may be imposed in order to limit the number of character strings searched. The application can apply the filters input by the user or imposed by the database system prior to using the regular expression. For example, the number of fields to be searched can be decreased by applying the filters.

In step 340, valid fields (i.e. fields passing the initial filters) are searched for a string matching the regular expression. Various mechanisms may be used to perform the search. One method, backtracking, is described below.

In step 350, the results are returned. In one embodiment, the matching strings may be aggregated and then returned all at once. In another embodiment, results associated with each matching string may be returned when that matching string is found. Additional filtering or searches may be performed using the matching strings. For example, data linked to a particular string may then be searched using filters (e.g. parameters) input by a user.

It is important to have high accuracy for search for character stings that match the regular expression. Otherwise, a user may not receive the expected results, which could have very dire effects. Accordingly, search methods can be quite complex in order to ensure that a matching string is always accurately found.

Search Methods (e.g. Backtracking)

Determining whether all or part of a character string matches a regular expression is not a simple task. The characters may be allocated among the operators in many different ways. For example, take the regular expression "a*a" and the sequence "aa". Both "a" characters could be allocated to the "a*" operation; or one "a" character could be allocated to the "a*" operation and the other a" character could be allocated to the second "a." Accordingly, sophisticated methods are used to ensure that matching strings are not missed. However, such methods may come at a cost of increased run time, as described below.

One such method is backtracking. Typically, backtracking algorithms try each possibility until they find the right one. It is a depth-first search (DFS) of the set of possible solutions. A DFS algorithm may be viewed including steps that traverse or search a tree, tree structure, or graph, where each branch from a node is a different possibility. One starts at the root, e.g. selecting some node as the root in the graph case, and explores as far as possible along each branch (alternative).

During the search, if an alternative does not work, the search backtracks to the choice point, i.e. the place that presented different alternatives, and tries the next alternative. When the alternatives are exhausted, the search returns to the previous choice point and tries the next alternative there. If there are no more choice points, the search fails.

FIGS. 4A-4F illustrates a backtracking algorithm according to an embodiment of the present invention. In this example, the regular expression is (a*)+b, which matches with a first pattern with any number of "a," finds a second pattern of one or more of the first pattern, and then a "b". The target character string that is input into the regular expression search engine and for which a match is being determined is "aaaaac".

FIG. 4A shows a process during a first pass through the target character string. Each "a" character is classified relative to the regular expression. During the first pass, each of the five "a" characters satisfies the "a*" part of the expression. Thus, each "a" is determined to be a match for the "a*" part, which is signified by the oval. Each arrow in FIG. 4A signifies at least one access to the regular expression and/or the input character string, and therefore is some measure of computational effort and/or time.

After "a*" matches each of the five "a" (signified as $a^5$), the expression "(a*)+" is found to be a match. Since $a^5$ exists at least once, this expression is matched to "(a*)+", just one time (1x). Not shown, is an additional step of identifying that more than one $a^5$ is not matched. When it is determined whether the next character is a "b", then the input character string fails as the next character is a "c".

In FIG. 4B, the method backtracks to the last decision point that satisfied part of the expression. Thus, the method backtracks to $a^4$, which still matched "a*". Note that a different direction for the error from the 4th "a", signifying a different decision being made.

At this point, it is determined that "$(a^4)$+" only occurs once, which takes some accesses to the regular expression or the input string. Then it is determined that "$(a^4)$+b" is not satisfied since the last character is "c". Note that the method does not remember what the next character is since, for robustness, each character is looked at anew for each new pass.

In FIG. 4C, the method backtracks to the next previous decision point that satisfied part of the expression. Thus, the method backtracks to $a^3$, which still matched "a*". At that point, the method checks to see if $a^3$ occurs more than once. The method performs two more accesses (one for each of the subsequent "a"s), but then realizes that the third "a" does not exist, thus failing.

In FIG. 4D, the method then backtracks again to the 3rd "a," where "$(a^3)$+" was matched once. The next character is checked again, and the input string fails when it is determined that the 4th "a" character is not a "b".

In FIG. 4E, the method backtracks to the next previous decision point that satisfied part of the expression. Thus, the method backtracks to $a^2$, which still matched "a*". At that point, the method checks to see if $a^2$ occurs more than once, which it does (twice 2x). The determination that the match is only 2x and not 3x takes additional operations as well. The method then fails when it is determined that the 5th "a" character is not a "b".

In FIG. 4F, the method backtracks all the way back to the beginning. Thus, the method backtracks to $a^1$, which still matched "a*". At that point, the method checks to see if $a^1$ occurs more than once. It is determined that $a^1$ occurs five times (5x), and not six times. The method then checks whether the 6th character is a "b". But, since it is a "c", the target fails to match.

Number of Operations in Search

As one can see, the amount of repetition for operations accessing the input string is quite high. Accordingly, the number of accesses to the input character string is not limited to the number of input characters. Thus, the number of operations increases at a rate greater than linear with the size of the input string.

Since the scaling of such search methods is greater than linear, the amount of computational cost for a string of N+1 "a" is not a fixed amount longer than the cost for a string of N "a". In other words, each new character adds more and more in the number of operations. This because the number of additional operations required for each additional "a" is not a fixed number.

This is because the number of times that the last character is accessed depends on the number of characters. Thus, the number of operations depends on N in some manner, which makes the dependence greater than linear. This includes a dependent of $N^X$ where X is greater than one. It also includes a dependence on $X^N$, also where X is greater than one. The latter is often called exponential growth.

In one embodiment, X equals 2 for a dependence of $2^N$. In this example, a string of "aaaaaac" would take twice as long to run than the string "aaaaac."

Figure 5:
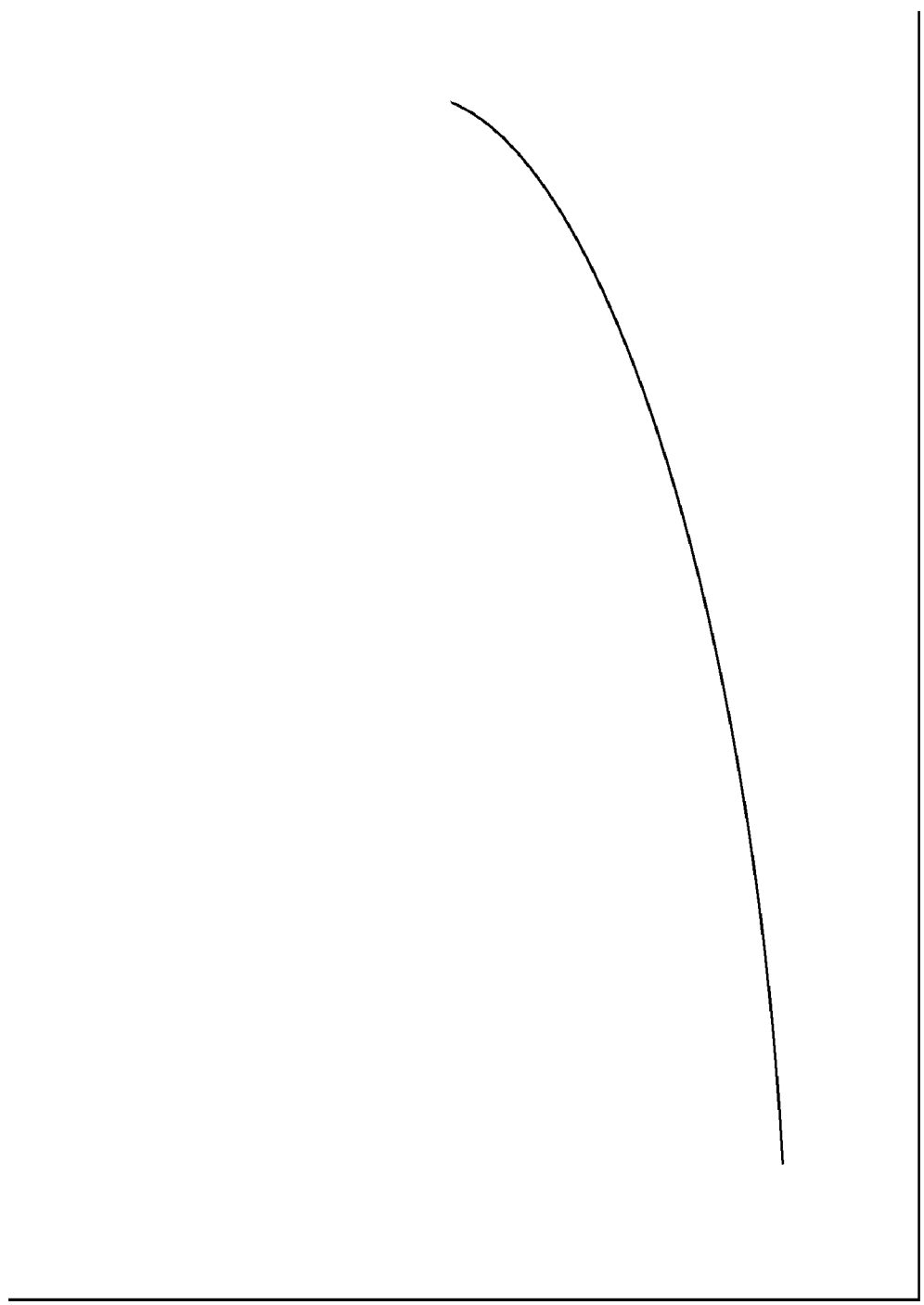
FIG. 5 is an exemplary plot showing exponential scaling of computational cost vs. the size of a character string according to an embodiment of the present invention.

FIG. 5 is an exemplary plot showing exponential scaling of computational cost vs. the size of a character string according to an embodiment of the present invention. The X axis is a measure of the size of the input string, e.g. the number characters in the string. The Y axis is the computational effort for the determination of whether the input character string matches the regular expression. The computational effort may, for example, be time or an operation count. As one can see, the computational effort can become quite large when certain regular expressions encounter certain input character strings.

When such an event does occur, the search application for the regular expressions may become overloaded. For example, the application may not be able to perform other searches that are being submitted by other users since one search is consuming too much resources. Thus, such an event could cause the application to become inoperable, which could cause a great loss in business and/or income to the entity providing a service uses the search application.

Typically the user is allowed to enter almost any regular expression. As the regular expression input by the user controls the search, a user can greatly affect the operation of the database. Also, the user may be able to enter any character string into the fields of the database. Thus, there is ample opportunity for improper use, either malicious or inadvertent, which can cause these unwanted results for the user and/or other users of the application. Therefore, it is desirable to prevent a hacker or novice user from consuming large amounts of CPU time, thereby being able to take down an application (such as a web server).

Preventing Misuse of Search

As just mentioned, an improper regular expression and input character string combination can halt or frustrate operation of a database system. Accordingly, it is desirable to prevent the search application from being derailed by the improper regular expression and string combination.

One could scan regular expressions before being submitted in a search, and regular expressions deemed improper could be refused. However, such a method would inevitably prevent some regular expressions that are actually proper from being accepted. Users would then not have the full flexibility that they desire.

It could be possible to have a timer for each query request, or each thread of the application that is servicing the query request. The application process could monitor the time for each thread. If the operation time for a particular thread reaches the maximum time, then the routine performing the search could be stopped. As used herein, a thread is contained inside a process. Different threads in the same process may share some resources.

However, stopping a thread by an external error call is not possible in some languages. For example, in Java, a routine that is busy executing a loop (as might occur in a search of a sting matching a regular expression) often cannot be stopped.

Figure 6A:
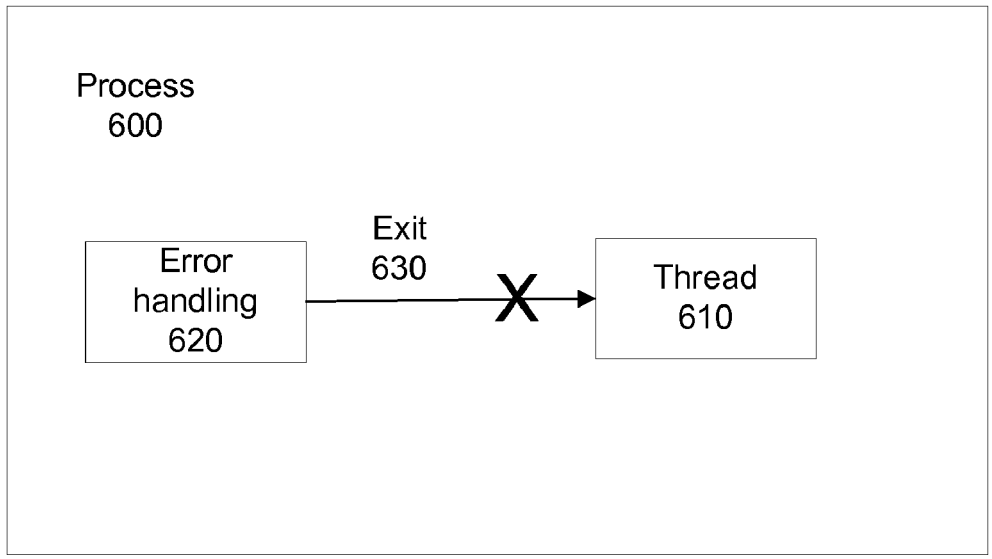
FIG. 6A shows a process 600 that is running a thread 610 to perform a regular expression search.

FIG. 6A shows a process 600 that is running a thread 610 to perform a regular expression search. The process includes an error handling routine or thread 620. However, when the error handling routine 620 sends an exit command 630 to the thread 610, the exit command is never performed. In one aspect, this may be because the thread is performing a tight loop (e.g. not waiting for a command), and therefore is too busy performing the search. For example, the loop may not pause to receive any commands.

The application process (e.g. the application server of the database system) could be terminated, but this would cause the whole application server to stop. Thus, this solution could cause as much problem as the long computational time of the regular expression search. Another possible solution is to have multiple processes, with each handling a different query, e.g., that uses a regular expression. However, having multiple processes would require a lot of overhead computational cost.

Figure 6B:
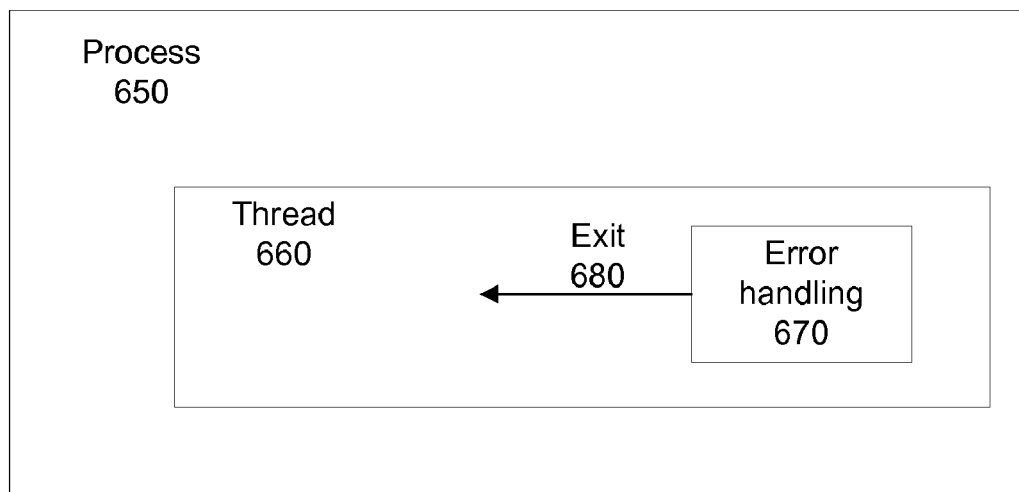
FIG. 6B shows a thread that performs an internal exit according to an embodiment of the present invention.

FIG. 6B shows a thread 660 that performs an internal exit 680 according to an embodiment of the present invention. The thread 660 is running as part of the process 650. Here, the error handling code 670 is part of the thread 660. For example, the error handling code 670 may check a variable or other value, and then determine whether an exit should occur. In one aspect, the error handling code 670 is part of the thread 660. As such, the error handling code 670 can ensure that the thread 660 will exit, or otherwise stop running the regular expression search. As shown, the exit command 680 is successful since the command is received and executed by thread 660. Therefore, an internal exit will occur when an error of an improper regular expression and input string combination is found.

Figure 7:
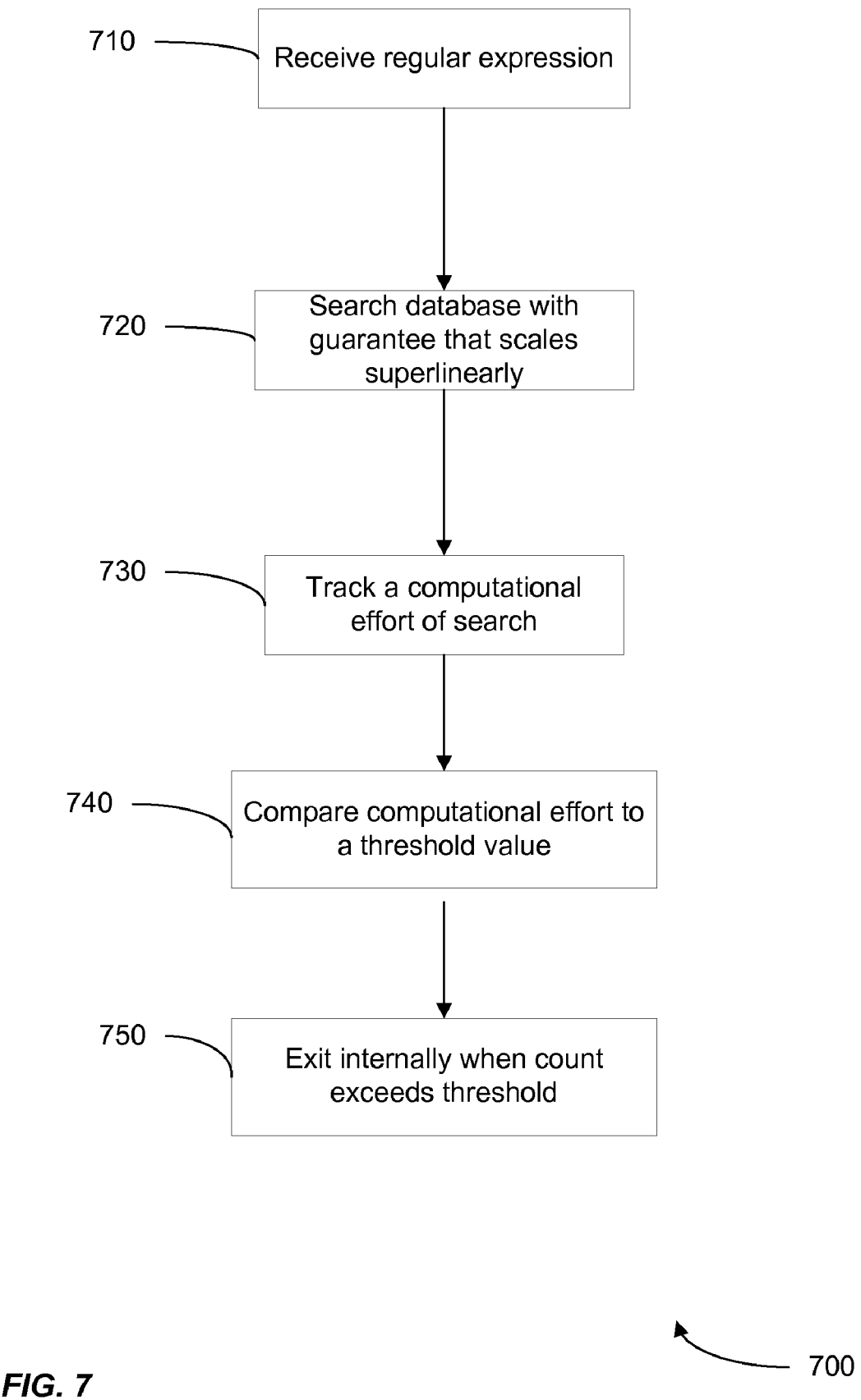
FIG. 7 is a flowchart illustrating a method for preventing misuse of database searches according to an embodiment of the present invention.

FIG. 7 is a flowchart illustrating a method 700 for preventing misuse of database searches according to an embodiment of the present invention. Steps of this method may be performed, for example, with a database system, such as system 16. Database systems implementing such a method can advantageously provide reliable service while still providing users flexibility and accuracy in their searches.

In step 710, a regular expression is received in a first thread of an application process. In one embodiment, the application process is running on an application server (e.g. server 100), which is part of a database system. (e.g. system 16). In one aspect, the database system may be an on-demand database system. In another aspect, the database system may be a multi-tenant database system.

In one embodiment, the first thread is encoded in Java. In another embodiment, the regular expression is received from a user via a user interface that is provided to a client system, e.g., via a Web interface. In other embodiments, the regular expression is received via a text interface which may be interactive or non-interactive (such as text messages or e-mail). The regular expression may be part of a query submitted by a user.

In step 720, a database is searched to find an input character string that matches the regular expression. In one embodiment, the search is part of a query submitted by the user. In one aspect, the input character strings are obtained from fields of the database.

In one embodiment, a duration of the searching scales superlinearly with a size of the input string. In other words, the increase in a computational effort (duration) for each additional character increases itself. Thus, the scaling is greater than linear. In one aspect, the size is the number of characters in the string or the amount of memory to store the character string. In another aspect, the greater than linear scaling is a result of guaranteeing that a determination of whether the input character string matches the regular expression is accurate.

In step 730, the first thread tracks a computational effort performed during the search. In one embodiment, an amount of time is tracked. For example, the time could be tracked by periodically calling a subroutine that returns a time. In another embodiment, a number of operations performed during the search is counted. For example, the number of operations may be tracked with a counter that is incremented with each step of a loop running in the first thread.

In one embodiment, the number of operations is a number of times that the regular expression has been accessed. In another embodiment, the number of operations is a number of accesses to a particular input character string. In yet another embodiment, the number of operations may be the total number of accesses to any input character string made during the search. In one aspect, the number of total operations may be tracked by passing a variable into and out of the search routine that finds a match to the regular expression.

In step 740, the computational effort is compared to a threshold value. In one embodiment, a number of operations is compared (e.g. with an IF statement) to a threshold value N. For example, in one embodiment, N equals 1 million operations (e.g. accesses). The value of N preferably catches malicious or stupid use, but not legitimate use of the database system. A value of 1 million is typically suitable for input character strings that require 1 kB-4 kB of storage.

In one embodiment, the value of N=1 million and a character string of 3-4 kB corresponds to a runtime for about 60 msec. In one aspect, the value for N is dependent on the size of the fields. Larger fields (i.e. longer input strings) might require a larger value for N. In another embodiment, the threshold value may be a maximum allowed elapsed time since a prior event, such as the start of a search or the start of a pattern match to a particular input character string.

In step 750, an internal exit is performed from the first thread when the computational effort exceeds a threshold value. In one embodiment, the computational effort exceeds when it is greater than a first threshold value. In another embodiment, the computation effort exceeds when it is greater than or equal to a second threshold value. In one aspect, this embodiment can be equivalent to the previous embodiment, e.g., when the first threshold value is 999,999 and the second threshold value is 1,000,000.

In one embodiment, the internal exit may be from a loop that is determining a pattern match of just one input character string. In one aspect, further input character strings may be searched with the current regular expression. In another aspect, the search of further input character strings with the current regular expression may be prevented.

In another embodiment, the internal exit may be from a loop that is performing the entire search. Thus, the search of further input character strings with the current regular expression would be prevented. In yet another embodiment, the internal exit may be from the entire thread. Thus, the thread may be killed.

In one embodiment, upon the internal exit, a message may be sent back to the user, e.g., that a counter was exceeded or that regular expression was too complicated. Comments as to why the regular expression was too complicated may be provided. For example, the "(a*)+" expression may pointed out as satisfying too many possibilities. Suggestions as to a new simpler or better expression may be provided to the user.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method for preventing misuse of database searches, the method comprising:
 receiving a regular expression in a search and error handling thread of an application process running on a processor, wherein the regular expression includes one or more tokens and one or more quantifiers;
 searching a database to find one or more input character strings that match the regular expression, wherein a duration of the searching scales greater than linearly with a size of an input character string in order to guarantee a determination of whether an input character string matches the regular expression including the quantifiers;
 tracking, within the search and error handling thread, a computational effort of searching for matches to the regular expression, wherein the tracking of the computational effort occurs during the searching of the database to find the one or more input character strings that match the regular expression;
 comparing the computational effort to a threshold value; and
 performing an internal exit in the search and error handling thread when the computational effort exceeds the threshold value prior to completion of the searching of the database.

2. The method of claim 1, wherein tracking a computational effort includes counting a number of operations performed during the search, and wherein the internal exit is performed when the number of operations exceeds the threshold value.

3. The method of claim 2, wherein the number of operations is a number of accesses to an input character string.

4. The method of claim 2, wherein the number of operations is a number of times that the regular expression has been accessed.

5. The method of claim 1, wherein the searching uses backtracking.

6. The method of claim 1, wherein the internal exit is from a routine of the search and error handling thread that performs the searching of the database.

7. The method of claim 1, wherein the search and error handling thread is encoded in Java.

8. The method of claim 1, wherein the internal exit is from a loop that is performing a determination of whether a particular input character string matches the regular expression.

9. The method of claim 8, further comprising stopping the searching the database to find an input character string that matches the received regular expression as a result of the internal exit.

10. A database system comprising:
 a processor;

an input interface for receiving a regular expression from a user;

logic that runs a search and error handling thread of an application process on the processor, wherein the search and error handling thread is configured to:

receive the regular expression, wherein the regular expression includes one or more tokens and one or more quantifiers;

search a database of the database system to find one or more input character strings that match the regular expression, wherein a duration of the searching scales greater than linearly with a size of an input character string in order to guarantee a determination of whether an input character string matches the regular expression including the quantifiers;

tracking, within the search and error handling thread, a computational effort of searching for matches to the regular expression wherein the tracking of the computational effort occurs during the searching of the database to find the one or more input character strings that match the regular expression;

compare the computational effort to a threshold value; and stopping the determination of whether an input character string matches the regular expression when the computational effort exceeds the threshold value prior to completion of the searching of the database.

11. The database system of claim 10, wherein the entire search of the database is stopped for the received regular expression.

12. The database system of claim 10, wherein the stopping is accomplished by an internal exit in the search and error handling thread when the computational effort exceeds the threshold value.

13. The database system of claim 12, wherein the internal exit is from a loop that is performing a determination of whether a particular input character string matches the regular expression.

14. The database system of claim 13, further comprising stopping the searching the database to find an input character string that matches the received regular expression as a result of the internal exit.

15. The database system of claim 12, wherein the internal exit is from a routine of the search and error handling thread that performs the searching of the database.

16. The database system of claim 10, wherein tracking a computational effort includes counting a number of operations performed during the search, and wherein the internal exit is performed when the number of operations exceeds the threshold value.

17. The database system of claim 16, wherein the number of operations is a number of accesses to an input character string.

18. A computer program product comprising a computer readable storage medium encoded with a plurality of instructions for controlling a computing system to perform an operation for preventing misuse of database searches, the instructions comprising:

receiving a regular expression in a search and error handling thread of an application process, wherein the regular expression includes one or more tokens and one or more quantifiers;

searching a database to find one or more input character strings that match the regular expression, wherein a duration of the searching scales greater than linearly with a size of an input character string in order to guarantee a determination of whether an input character string matches the regular expression including the quantifiers;

tracking, within the search and error handling thread, a computational effort of searching for matches to the regular expression wherein the tracking of the computational effort occurs during the searching of the database to find the one or more input character strings that match the regular expression;

comparing the computational effort to a threshold value; and performing an internal exit in the search and error handling thread when the computational effort exceeds the threshold value prior to completion of the searching of the database.

19. The computer program product of claim 18, wherein tracking a computational effort includes counting a number of operations performed during the search, and wherein the internal exit is performed when the number of operations exceeds the threshold value.

20. The computer program product of claim 18, wherein the internal exit is from a loop that is performing a determination of whether a particular input character string matches the regular expression.

* * * * *